United States Patent [19]

Leikam

[11] 4,435,872
[45] Mar. 13, 1984

[54] SPHEROID PIG LAUNCHER

[76] Inventor: Vernon Leikam, P.O. Box 2069, Ponca City, Okla. 74602

[21] Appl. No.: 376,732

[22] Filed: May 10, 1982

[51] Int. Cl.³ .............................................. B08B 9/04
[52] U.S. Cl. ................................. 15/104.06 A; 166/70
[58] Field of Search .............. 15/104.06 R, 104.06 A, 15/104.06 B, 3.5, 3.51; 137/268; 166/70

[56] References Cited

U.S. PATENT DOCUMENTS

| | | | |
|---|---|---|---|
| 3,148,689 | 9/1964 | Bean et al. | 15/104.06 A X |
| 3,169,263 | 2/1965 | Eagleton | 15/104.06 A |
| 3,216,500 | 11/1965 | Diehl | 15/104.06 A |
| 3,224,247 | 12/1965 | Barrett, Jr. | 15/104.06 A |
| 3,266,077 | 9/1966 | Elliott et al. | 15/104.06 A |
| 3,444,928 | 5/1969 | Pitts | 15/104.06 A |
| 4,351,079 | 9/1982 | Fitzpatrick | 15/104.06 A |

*Primary Examiner*—Edward L. Roberts

[57] ABSTRACT

An improvement in a launcher for launching spheroid pigs one at a time into a pipeline, having a downward sloping barrel magazine for holding a multiplicity of spheroid pigs and having a closable fluid tight opening for loading the pigs on the breech end and a full bore opening valve on the muzzle end in fluid communication with a pipeline, is characterized by apparatus situated in the barrel magazine upstream of the full bore valve for releasing the pigs one at a time into the pipeline from the magazine. The releasing apparatus of the improvement comprises:

(a) a shaft means passing sealably through the wall of the magazine,
(b) on the exterior of the magazine, a means affixed to the shaft for turning the shaft radially along its long axis, and
(c) affixed to the shaft on the interior of the magazine, a catcher-releaser having a convexoid surface adjacent to the end of the shaft and a concavoid surface opposite the convexoid surface, the catcher-releaser being truncated parallel to the long axis of the shaft, such that rotation of the shaft through 365° will catch and release a single spheroid pig.

5 Claims, 7 Drawing Figures

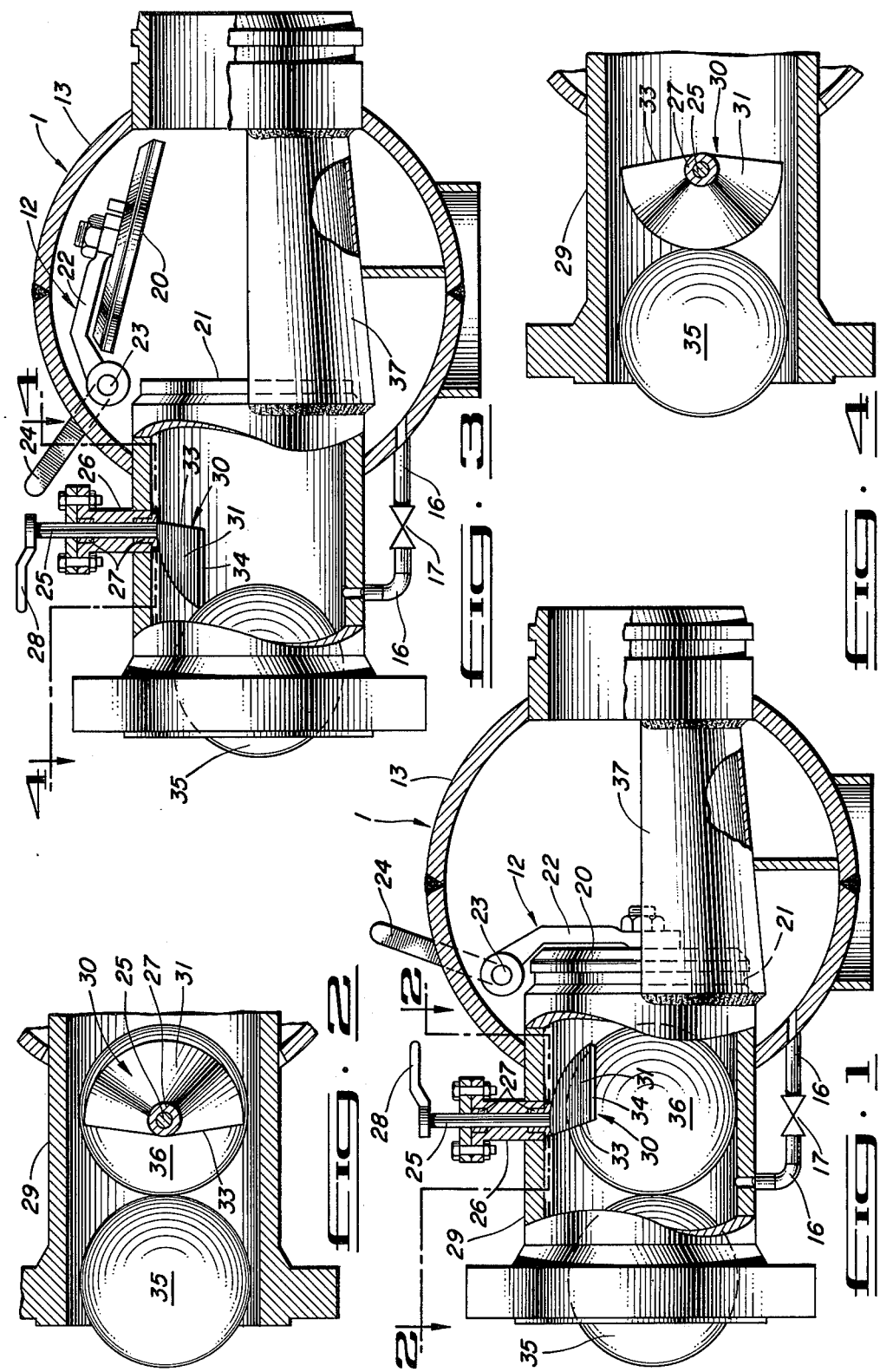

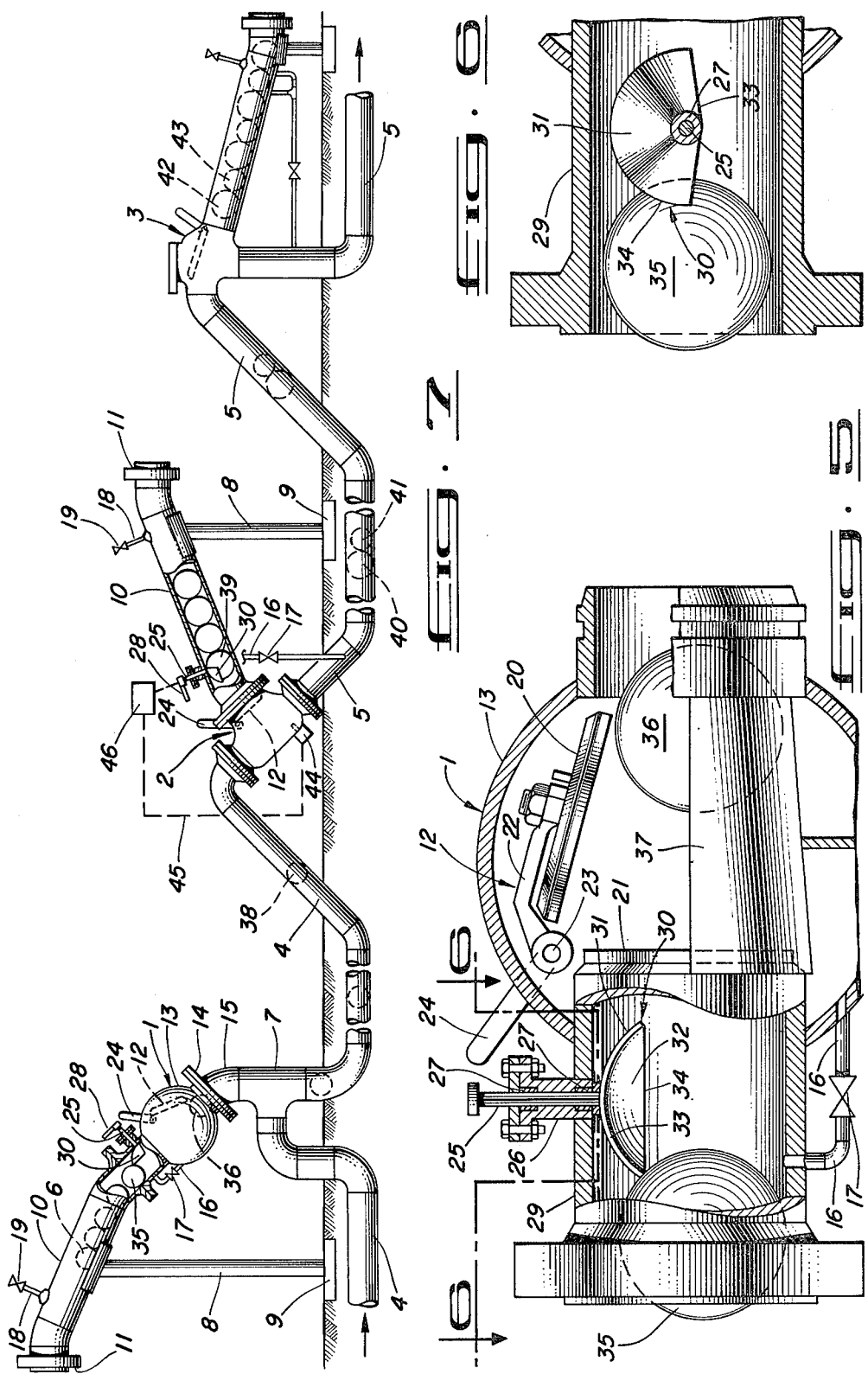

SPHEROID PIG LAUNCHER

BACKGROUND OF THE INVENTION

The invention relates to an improved launcher for launching spheroid pigs into pipelines.

BRIEF DESCRIPTION OF THE PRIOR ART

The following, inter alia, is intended to be a prior art statement in accordance with and guidance of 35 CFR 1.5, 1.97, and 1.98.

Spheroid pigs, commonly rubber spheres, have been used for many years in the pipeline transmission industry. They are used to clean, evacuate, and internally coat pipelines. They are used for product separation, measuring volumes and velocities, to actuate signals and controls, for meter caliberation, and for testing of pipelines. More recently, they have been employed to control condensate in gas gathering systems.

Such spheres are easy to handle. They can be made to compensate for wear. They negotiate irregular bends and turns including short or long radius 90° ells. They require low energy for movement, usually only about one pound differential in pressure. They are safe due to the absence of spark producing metal parts. They will travel through over-sized or undersized pipe. Such spheres are available in solid or inflatable types. A commercially available solid type comes in sizes from one and half through four inches in diameter. The inflatable type is available up to and including 36 inches in diameter. They are commercially available in accordance with nominal pipe sizes. Inflatable spheres are the most popular, as they can be pressured to fit various inside diameters of pipe. Materials employed to inflate such spheres include water, mixtures of water and ethylene glycol, ethylene glycol, and other alcoholic compounds. The choice of inflating media will depend upon whether the use of such spheroid pigs is in the removal of condensates from natural gas pipelines. Condensates of liquid hydrocarbons often accumulate in the low spots in a gathering or transmission system. If the gas in the line is water wet, hydrates will often form. Hydrates, if allowed to accumulate, can create operating problems, especially during cold weather months. Such hydrates may cause increase of operating pressure Use of wellhead dehydrators, seperators, or heaters is one solution to the problem. Another solution is to keep the line free of liquid hydrocarbons by periodic pigging with spheroid pigs. The pigging method has several advantages. First, pigging with spheroids is more economical than operation of many dehydrators and treaters. Second, moving the liquid hydrocarbons to a central gathering point does away with lease storage, drips, and the like. The fuel used to fire heaters and separators can be saved.

A successful pigging system depends on getting spheres into and out of the line without flow interruption. One successful commerically available system is the Unilaunch sphere launching and sphere receiving system available from the Wheatly Company of Tulsa, Okla. This system is more completely described in "In Line Pigging With Spheres" by Del Moore, Wheatly Company, Tulsa, Okla. A copy of this article is filed with this application. The system is more completely described in U.S. Pat. Nos. 3,169,263 and 3,166,094, herewith incorporated by reference. The Wheatly system is commercially available and has been of considerable benefit to the industry. However, the Wheatly sphere selector mechanism is comprised of a large number of intricate parts and is situated where it is subjected to the internal environment of the pipeline. This subjects the complex moving parts to effects of gumming, corrosion, erosion, and other adverse effects.

My invention constitutes a substantial improvement on such prior art apparatus. It is simplier, easier to fabricate, and much less subject to mechanical difficulties.

OBJECT OF THE INVENTION

An object of the invention is to provide an improved apparatus for the launching of spheroid pigs into pipelines. More particularly, it constitutes an improvement in apparatus for releasing the spheroid pigs one at a time.

SUMMARY OF THE INVENTION

An improvement in spheroid pig launchers of the type employed for launching spheroid pigs one at a time into a pipeline and characterized by a downward sloping barrel magazine for holding a multiplicity of spheroid pigs having a closable opening for loading the pigs on the breech end a full bore opening valve on the muzzle end in fluid communication with a pipeline characterizes the invention. The improvement comprises apparatus situated in the barrel magazine upstream of the full bore valve for releasing the pigs one at a time into the pipeline from the magazine. The apparatus comprises:

(a) a shaft means passing sealably through the wall of the magazine, (b) on the exterior of the magazine, a means affixed to the shaft for turning the shaft radially along its long axis, and (c) affixed to the shaft on the interior of the magazine, a catcher-releaser having a convexoid surface adjacent to the end of the shaft and a concavoid surface opposite the convexoid surface, the catcher-releaser being truncated parallel to the long axis of the shaft, such that rotation of the shaft through 365° will catch and release the single spheroid pig.

BRIEF DESCRIPTION OF THE DRAWINGS

FIG. 1 illustrates a cross-section of an embodiment of the improved spheriod pig launcher of the invention, with particular emphasis on the improved apparatus for releasing the pigs one at a time, shown in the loading mode.

FIG. 2 is a top sectional view taken along plane 2—2 of FIG. 1.

FIG. 3 is a cross-sectional view of the spheroid pig launcher shown in FIG. 1, but shown in the launching mode with a pig just having been launched, and the next pig being retained.

FIG. 4 is a top sectional view taken along plane 4—4 of FIG. 3.

FIG. 5 is a cross-sectional view of the spheroid pig launcher shown in FIGS. 1 and 3, but shown in between the loading mode of FIG. 1 and the launching mode of FIG. 3.

FIG. 6 is a top sectional view taken along plane 6—6 of FIG. 5.

FIG. 7 is a semi-schematic view showing two embodiments of the pig launcher of the invention situated in a pipeline with a prior art pig catcher also situated (downstream) in the line.

DESCRIPTION OF THE DRAWINGS

The same numbers are employed in all figures to refer to the same features.

Referring to FIG. 7, first, to show an overall perspective, a smaller diameter pipeline 4 for carrying hydrocarbons is shown toward the left being first addressed with a first embodiment of the pig launcher of the invention 1 and then at the point where it connects to larger pipeline 5 being addressed by a second embodiment of the pig launcher of the invention 2. Pigs are removed from the larger line 5 by prior art pig catcher 3 which is more particularly described in U.S. Pat. No. 3,166,094.

Viewing the launcher in the left third of FIG. 7, the launcher 1 with the apparatus for release of the pigs one at a time is positioned in the mode shown in FIG. 3.

In the center third of FIG. 7, an embodiment of the invention is shown in the catching mode, but ready to release a spheroid pig at the appropriate time.

Another mode, the loading mode, is shown in the detail of FIG. 1.

Yet another mode, the in-between mode, ready for launch but yet retaining the pig, is shown in the detail of FIG. 5.

Referring now more particularly to the embodiment 1, shown in FIG. 7, and to the other Figures as appropriate, the features are particularly described. Spheroid pig launcher 1 for launching smaller spheroid pigs 6 one at a time into a pipeline 4 is joined thereto at junction 7 and is supported by support 8 affixed to foundation 9.

The launcher comprises a downward sloping barrel magazine 10 for holding a multiplicity of smaller spheroid pigs 6. It has a closable fluid tight full bore opening 11 for loading the pigs on its breach end. A full bore opening valve 12 is situated on the muzzle end, which is in fluid communication with the pipeline 4 via housing 13, flanged connection 14, and line 15.

The barrel magazine 10 is in fluid communication with the housing 13 downstream of the full opening valve 12 by means of line 16 having a valve 17. The barrel magazine also has blowdown line 18 and blowdown valve 19 for releasing pressure for loading of spheroid pigs through the breech end after full opening valve 12 has been closed.

Referring now, more particularly, to the embodiment shown in FIGS. 1 through 6, full opening valve 12 is, in the embodiment shown, a clapper valve having clapper member 20 for sealing against sealing lip 21 when closed. The clapper valve also has arm member 22 affixed to shaft 23 which passes through a sealed bearing in housing 13 and is actuated by means of lever 24.

Particularly referring to the point of invention, a shaft 25 passes through the wall 29 of the magazine 10 by way of a bearing 26 having seals 27, and is actuated by lever 28 affixed to the outer end which rotates catcher-releaser 30 about the long axis of the shaft 25. Catcher-releaser 30 is affixed to the shaft interior in the magazine.

Catcher-releaser 30 has (with reference to the long axis of the magazine) an outer convexoid surface 31 and an inner concavoid surface 32. It has a truncation 33 generally parallel to the long axis of the shaft, and in the embodiment shown, has a trunciation 34 perpendicular to the long axis of the shaft. It is sized and shaped such that rotation of the shaft through 365° will catch and release a single spheroid pig.

Particular spheroid pigs are designated 35, 36, 37, 38, 39, 40, 41, 42, and 43. These particular numbered spheroid pigs will be employed later to more particularly describe the invention.

An internal ramp 37 in the launcher provides guidance for the pig after passing from the muzzle end of the barrel magazine 10.

In the embodiment particularly shown in the center of FIG. 7, a sensor 44 is connected via line 45 to actuator 46 for rotating or reciprocating the apparatus for releasing the larger pigs 39 one at a time responsive to passage of a smaller pig 6 from pipeline 4 into larger pipeline 5. The larger pig exemplified by pig 40 pushes the smaller pig exemplified by spherical pig 41 on through the larger pipeline 5 along with condensate and the like.

PREFERRED EMBODIMENTS OF THE INVENTION

Particularly referring to embodiment 1 as shown in FIG. 7 and elaborated upon in FIGS. 1, 2, 3, 4, 5, and 6, operational specifics are described as follows.

Referring first to the mode shown in FIGS. 1 and 2, in overall context as shown in embodiment 1 of FIG. 7, the launcher is in the loading mode. Full bore opening valve 12 is closed with clapper member 20 sealing against sealing lip 21 to prevent gas from line 4 from passing into barrel magazine 10. Valve 17 is closed, also preventing hydrocarbon pressure from pipeline 4 from passing into barrel magazine 10. Full bore opening 11 is opened before loading pigs 6 into barrel magazine 10 after hydrocarbon pressure has been blown from barrel magazine 10 opening blowndown valve 19 on blowndown line 18. Lever 28 and catcher-releaser 30 are in the catching position as shown in FIG. 1 to retain spheroid pigs 36, 35, and 6 in downward sloping barrel magazine 10.

Once barrel magazine 10 is loaded with pigs, full bore opening 11 is closed. Blowdown valve 19 on blowdown line 18 is also closed upon purging of air from barrel magazine 10 by opening valve 17 on bypass line 16. This brings the barrel magazine 10 to the same pressure as pipeline 4. Thereupon, actuating lever 24 is moved to open the clapper valve 12 so that the spheroid pigs can be launched into the pipeline 4 as needed or desired.

Launching of the spheroid pigs one at a time is accomplished by moving actuating lever 28 such as to rotate or reciprocate catcher-releaser 30 from the catching mode shown in FIGS. 1 and 2, holding spheroid pigs 36, 35, and 6 ready for launching.

Launching is visualized best by going to the next mode in sequence, the in between mode, as shown in FIGS. 5 and 6. Thus, it is seen that actuating lever 28 is rotated counter clockwise effecting rotation of shaft 25 and catcher-releaser 30 such as to release spheroidal pig 36 which is near the end of ramp 37 and ready to enter pipeline 4. Truncation 33 has cleared spheroidal pig 36 while retaining spheroidal pig 35.

Continued rotation of actuating lever 28, shaft 25, and catcher-releaser 30 puts the apparatus in the mode shown in FIGS. 3 and 4. The spheroidal pig 35 continues to be retained.

Here, it might be well to explain that shaft 25 and catcher-releaser 30 can be either reciprocated or rotated. If rotated, the mode shown in FIG. 3 is the next step after the mode shown in FIG. 5. The next step after FIG. 3 would, of course, involve the catcher-releaser 30 rotating out toward the viewer in a mode opposite that of FIG. 5 wherein spheroidal pig 35 is released by the trailing edge of the truncation 33 after the leading edge of the truncation 33 on the opposite side of the catcher-releaser is in position to catch the spheroidal pig 35 within its concavoid surface 32, as shown in the mode of FIG. 1, but with spheroidal pig 36 ready for launch.

Of course, rotation can be either clockwise or counter clockwise.

In another mode of operation, lever 28, shaft 25, and catcher-releaser 30 can reciprocate back and forth from the position shown in FIG. 5, or of course, 180° opposite from that position. It is not necessary that the reciprocation go as far as the position shown in FIGS. 1 and 3, but only so far that sequential pigs are caught and released by the catcher-releaser.

The catcher-releaser 30 has a criticality of its convexoid-concavoid shape. It is essential that the shape be such that when one spheroidal pig is released that the opposite end of the truncation 33 catch the next pig in line. It is also necessary that when the catcher-releaser is positioned such that the leading edge of the truncation 33 allows the pig to go into the concavoid surface, that the other leading edge of the truncation 33 be in position to catch the spheroidal pig.

Though the truncation 34 perpendicular to the long axis of the shaft is shown above the center of the spheroidal pig, in fact, about two thirds of the way up, this is not essential. In fact, the catcher-releaser, in accord with another embodiment, can attach to a second shaft opposite the shaft 25. In addition, it can have slots cut out of it, be fabricated in straps, or have other configurations that will suggest themselves to those skilled in the art. The configuration shown is the one which is presently preferred because of ease of fabrication and trouble free operation.

Though a simple lever 28 is shown as an actuating means for rotating or reciprocating shaft 25 and catcher-releaser 30, other means for such reciprocation or rotation can be employed. A toothed gear, friction drive wheel, pulley, or many other means will suggest themselves to those skilled in the art.

Such rotation or reciprocation can be done manually. However, it is often more convenient to accomplish such actuation by electrical, pneumatic, hydraulic, or other means. A variety of equipment is known to those skilled in the art for such robotic actuation.

Looking at another embodiment of the invention, as particularly shown in embodiment 2 in FIG. 7, it can be discerned that a similar but different emodiment from that shown in embodiment 1 is suitable for a different application.

In this embodiment, a spheroidal pig 38 is passing up pipeline 4 from left to right. As it arrives at sensor 44 prior to entry into larger pipeline 5; sensor 44, via line 45, actuates actuator 46 which reciprocates or rotates shaft 25 and catcher-releaser 30 such as to release larger spheroidal pig 39 which is sized to sweep through pipeline 5 with efficiency. It pushes smaller spheroidal pig 38 ahead of it. Earlier triggering spheroidal pig 41 and triggered spheroidal 40 are shown in a position further down the line 5.

Yet earlier launched larger spheroidal pig 42 and smaller spheroidal pig 43 from pipeline 44 are shown in the receiving barrel of the pig catcher 3. This catcher is of prior art design. The design shown in U.S. Pat. No. 3,166,094 is quite suitable.

The timing of individual launching of spheroidal pigs by the invention emodiment shown in embodiment 1 can be by conventional means. For example, if robotics are employed to actuate the shaft and catcher-release mechanism, such robotics can be triggered by accumulation of liquid at low points in the pipeline, by sensors which determine the amount of fluid flowing past a point, or by a simple timing mechanism.

Though a simple clapper valve is shown in the embodiments described for the full opening valve 12, other types of full opening valves can be employed. For example, full opening gate valves and other conventional valves can be employed. The function of the valve is to shut off line pressures so that the barrel magazine can be blown down and loaded. It does not operate while launching is taking place.

Specific exemplification has been presented in this application to better disclose the invention in its presently preferred modes, however, it is to be understood that the invention is not limited by the specific exemplification, but is limited only by the application as a whole.

What I claim is:

1. In a launcher for launching spheroid pigs one at a time into a pipeline comprising:

a downward sloping barrel magazine for holding a multiplicity of spheroid pigs, the magazine having a closable fluid tight opening for loading the pigs on the breech end and a full bore opening valve on the muzzle end in fluid communication with a pipeline the magazine characterized by having a generally downwardly sloping lower surface such that the pigs will pass from the breech end to the muzzle end of the magazine in response to the force of gravity;

the improvement comprising:

apparatus situated in connection with the magazine upstream of the full bore valve for releasing the pigs one at a time into the pipeline from the magazine;

said apparatus having:

(a) a shaft means passing sealably through the wall of the magazine, (b) on the exterior of the magazine, a means affixed to the shaft for turning the shaft, and (c) affixed to the shaft on the interior of the magazine, a catcher-releaser affixed to the end of the shaft having a convexoid surface and a concavoid surface opposite the convexoid surface, the concavoid surface generally adapted to mate with a portion of the surface of one of the pigs, the catcher-releaser having a truncation generally parallel to the long axis of the shaft, and a truncation generally perpendicular to the long axis of the shaft, such that rotation of the shaft will catch and release a single spheroid pig.

2. The apparatus of claim 1 wherein the operator means is activated by a timer, for automatic launching.

3. The apparatus of claim 1 wherein the operator means is activated by a means which senses the passing of a samller spheroid pig from a smaller diameter pipeline than the larger spheroid pig launched into a larger diameter pipeline.

4. The apparatus of claim 1 wherein the means affixed to the shaft for turning it is adapted to reciprocate the catcher-releaser such as to catch and release spheroid pigs in sequence.

5. The apparatus of claim 1 wherein the means affixed to the shaft for turning it is adapted to rotate the catcher-releaser such as to catch and release spheroid pigs in sequence.

* * * * *